(12) United States Patent
Akkapeddi et al.

(10) Patent No.: US 12,223,479 B2
(45) Date of Patent: *Feb. 11, 2025

(54) DETECTING USAGE ISSUES ON ENTERPRISE SYSTEMS AND DYNAMICALLY PROVIDING USER ASSISTANCE

(71) Applicant: Bank of America Corporation, Charlotte, NC (US)

(72) Inventors: Naga Vamsi Krishna Akkapeddi, Charlotte, NC (US); Morgan S. Allen, Waxhaw, NC (US); Susan Moss, Vestal, NY (US); Stephen T. Shannon, Charlotte, NC (US); Siten Sanghvi, Westfield, NJ (US); Pratap Dande, Saint Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,662

(22) Filed: Jun. 20, 2023

(65) Prior Publication Data

US 2023/0334451 A1 Oct. 19, 2023

Related U.S. Application Data

(63) Continuation of application No. 16/939,807, filed on Jul. 27, 2020, now Pat. No. 11,720,869.

(51) Int. Cl.
*G06Q 20/10* (2012.01)
*G06V 20/52* (2022.01)
(Continued)

(52) U.S. Cl.
CPC ......... *G06Q 20/1085* (2013.01); *G06V 20/52* (2022.01); *G06V 40/166* (2022.01); *G06V 40/172* (2022.01); *G06V 20/625* (2022.01)

(58) Field of Classification Search
CPC ............ G06Q 20/1085; G06Q 20/325; G06Q 20/40145; G06V 20/52; G06V 40/166;
(Continued)

(56) References Cited

U.S. PATENT DOCUMENTS 8,807,424 B1 8/2014 Meek
9,355,530 B1 5/2016 Block et al.
(Continued)

OTHER PUBLICATIONS

Sep. 16, 2022—(US) Non-Final Office Action—U.S. Appl. No. 16/939,807.
(Continued)

*Primary Examiner* — Abhishek Sarma
(74) *Attorney, Agent, or Firm* — Banner & Witcoff, Ltd.

(57) ABSTRACT

Aspects of the disclosure relate to detecting usage issues on enterprise systems and dynamically providing user assistance. In some embodiments, a computing platform may receive, from an automated teller system, user presence information indicating that a user has been detected at an automated teller machine associated with the automated teller system. Subsequently, the computing platform may identify, based on the user presence information received from the automated teller system, that the user has a need for assistance with the automated teller machine associated with the automated teller system. In response to identifying that the user has the need for assistance, the computing platform may generate and send one or more commands directing the automated teller machine associated with the automated teller system to execute one or more automated assistance actions corresponding to the need for assistance.

19 Claims, 6 Drawing Sheets

(51) Int. Cl.
*G06V 20/62* (2022.01)
*G06V 40/16* (2022.01)

(58) Field of Classification Search
CPC .... G06V 40/172; G06V 20/625; G06V 40/18; G07F 19/207
See application file for complete search history.

(56) References Cited

U.S. PATENT DOCUMENTS

| | | |
|---|---|---|
| 2009/0140838 A1 | 6/2009 | Newman et al. |
| 2016/0171461 A1* | 6/2016 | Hoover .................. G07F 19/20 705/43 |
| 2017/0337782 A1* | 11/2017 | Nelson, Jr. ............ G07F 19/202 |
| 2020/0204949 A1 | 6/2020 | Saxena et al. |
| 2020/0204973 A1 | 6/2020 | Hamilton et al. |
| 2020/0207358 A1 | 7/2020 | Katz et al. |
| 2020/0210464 A1 | 7/2020 | Newell et al. |
| 2020/0210900 A1 | 7/2020 | McCord et al. |
| 2020/0210951 A1 | 7/2020 | Perez |
| 2020/0213300 A1 | 7/2020 | Edwards et al. |
| 2020/0213436 A1 | 7/2020 | Mumick |
| 2020/0213873 A1 | 7/2020 | Henry et al. |
| 2020/0216086 A1 | 7/2020 | Lenke et al. |
| 2020/0219052 A1 | 7/2020 | Comeau |
| 2020/0219156 A1 | 7/2020 | Grubb |
| 2020/0220792 A1 | 7/2020 | Dippenaar et al. |
| 2020/0225655 A1 | 7/2020 | Cella et al. |
| 2020/0225684 A1 | 7/2020 | Anderson et al. |
| 2020/0226562 A1 | 7/2020 | Shah et al. |
| 2020/0226692 A1 | 7/2020 | Lutnick et al. |
| 2020/0226918 A1 | 7/2020 | Kinney et al. |
| 2020/0228160 A1 | 7/2020 | Bennett et al. |
| 2020/0228550 A1 | 7/2020 | Ravindranathan et al. |
| 2020/0228921 A1 | 7/2020 | Reed et al. |
| 2020/0233411 A1 | 7/2020 | Ivanov et al. |
| 2020/0233865 A1 | 7/2020 | Myers et al. |
| 2020/0234380 A1 | 7/2020 | Dulori |
| 2020/0236496 A1 | 7/2020 | Reed et al. |

OTHER PUBLICATIONS

Mar. 22, 2023—(US) Notice of Allowance—U.S. Appl. No. 16/939,807.

* cited by examiner

FIG. 5

DETECTING USAGE ISSUES ON ENTERPRISE SYSTEMS AND DYNAMICALLY PROVIDING USER ASSISTANCE

CROSS REFERENCE TO RELATED APPLICATIONS

This application is a continuation of and claims priority to co-pending U.S. application Ser. No. 16/939,807, filed Jul. 27, 2020, and entitled "Detecting Usage Issues on Enterprise Systems and Dynamically Providing User Assistance," which is incorporated herein by reference in its entirety.

BACKGROUND

Aspects of the disclosure relate to deploying digital data processing systems, managing enterprise data and resources, and providing automated assistance to users of enterprise systems. In particular, one or more aspects of the disclosure relate to detecting usage issues on enterprise systems and dynamically providing user assistance.

Enterprise organizations may deploy various systems and interfaces to serve customers and other users. For example, financial institutions may deploy and operate automated teller machines (ATMs) at various locations to help customers complete different transactions and perform other functions. In some instances, a user of an ATM may require assistance, particularly if the user does not have much previous experience using ATMs. In some instances, however, it may be difficult to provide relevant assistance to such a user due to the automated nature of ATMs and because of other constraints associated with ATM hardware and software.

SUMMARY

Aspects of the disclosure provide effective, efficient, scalable, and convenient technical solutions that address and overcome the technical problems associated with assisting users of ATMs by providing techniques for detecting usage issues on enterprise systems and dynamically providing user assistance.

In accordance with one or more embodiments, a computing platform having at least one processor, a communication interface, and memory may receive, via the communication interface, from an automated teller system, user presence information indicating that a first user has been detected at a first automated teller machine associated with the automated teller system. Subsequently, the computing platform may identify, based on the user presence information received from the automated teller system, that the first user has a need for assistance with the first automated teller machine associated with the automated teller system. In response to identifying that the first user has the need for assistance, the computing platform may generate one or more commands directing the first automated teller machine associated with the automated teller system to execute one or more automated assistance actions corresponding to the need for assistance. Then, the computing platform may send, via the communication interface, to the automated teller system, the one or more commands directing the first automated teller machine associated with the automated teller system to execute the one or more automated assistance actions corresponding to the need for assistance. In addition, sending the one or more commands directing the first automated teller machine associated with the automated teller system to execute the one or more automated assistance actions corresponding to the need for assistance may cause the first automated teller machine associated with the automated teller system to execute the one or more automated assistance actions corresponding to the need for assistance.

In some embodiments, receiving the user presence information from the automated teller system may include receiving face recognition data captured by a facial recognition camera connected to the first automated teller machine associated with the automated teller system.

In some embodiments, receiving the user presence information from the automated teller system may include receiving license plate data from a drive-up camera connected to the first automated teller machine associated with the automated teller system.

In some embodiments, receiving the user presence information from the automated teller system may include receiving device detection data from an enterprise center monitoring system deployed at a location associated with the automated teller system.

In some embodiments, identifying that the first user has the need for assistance with the first automated teller machine associated with the automated teller system may include determining that the first user is a new user of the first automated teller machine.

In some embodiments, identifying that the first user has the need for assistance with the first automated teller machine associated with the automated teller system may include determining that the first user is idle at the first automated teller machine.

In some embodiments, identifying that the first user has the need for assistance with the first automated teller machine associated with the automated teller system may include determining that the first user is looking at one or more menu items based on eye detection data captured by a camera connected to the first automated teller machine associated with the automated teller system.

In some embodiments, identifying that the first user has the need for assistance with the first automated teller machine associated with the automated teller system may include determining that the first user is holding one or more physical items based on object detection data captured by a camera connected to the first automated teller machine associated with the automated teller system.

In some embodiments, identifying that the first user has the need for assistance with the first automated teller machine associated with the automated teller system may include determining that the first user is having a specific issue based on audio data captured by a microphone connected to the first automated teller machine associated with the automated teller system.

In some embodiments, identifying that the first user has the need for assistance with the first automated teller machine associated with the automated teller system may include determining that the first user is linked to a foreign institution based on user credentials data received from the first automated teller machine associated with the automated teller system.

In some embodiments, generating the one or more commands directing the first automated teller machine associated with the automated teller system to execute the one or more automated assistance actions corresponding to the need for assistance may include generating at least one command that causes the first automated teller machine to display one or more dynamically colored navigation options.

In some embodiments, generating the one or more commands directing the first automated teller machine associated with the automated teller system to execute the one or more automated assistance actions corresponding to the need for assistance may include generating at least one command that causes the first automated teller machine to display a tutorial video based on a sequence of the first user's interactions with the first automated teller machine.

In some embodiments, generating the one or more commands directing the first automated teller machine associated with the automated teller system to execute the one or more automated assistance actions corresponding to the need for assistance may include generating at least one command that causes the first automated teller machine to initiate a video assistance call with the first user on a display screen connected to the first automated teller machine.

In some embodiments, generating the one or more commands directing the first automated teller machine associated with the automated teller system to execute the one or more automated assistance actions corresponding to the need for assistance may include generating at least one command that causes the first automated teller machine to initiate a video assistance call with the first user on a mobile computing device linked to the first user.

In some embodiments, generating the one or more commands directing the first automated teller machine associated with the automated teller system to execute the one or more automated assistance actions corresponding to the need for assistance may include generating at least one command that causes the first automated teller machine to display assistance information identifying one or more steps to perform one or more functions on the first automated teller machine.

In some embodiments, generating the one or more commands directing the first automated teller machine associated with the automated teller system to execute the one or more automated assistance actions corresponding to the need for assistance may include generating at least one command that causes the first automated teller machine to display update information identifying one or more recently updated functions of the first automated teller machine.

In some embodiments, generating the one or more commands directing the first automated teller machine associated with the automated teller system to execute the one or more automated assistance actions corresponding to the need for assistance may include generating at least one command that causes the first automated teller machine to display replacement information identifying one or more replacement functions available at the first automated teller machine.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to detecting usage issues (e.g., involving customers and banking technology) and dynamically providing customer assistance. For example, in some instances, customers may be interacting with a financial institution via new methods—e.g., customers who have never used an ATM may now be visiting ATMs— so as to comply with federal and/or local guidelines and/or to engage in contactless banking. Using current and future ATM/ATA technology, the financial institution may detect when a customer is experiencing a usage issue and automatically and/or dynamically provide the customer with assistance. For example, using one or more ATM cameras, the ATM and/or back-office computer systems supporting the ATM may detect when a customer visits an ATM for the first time (e.g., using image detection/facial recognition). The ATM may provide visual and/or audio prompts (e.g., 'I see you are new here—are you new to the area? New to ATMs in general? Can I provide you with some additional help with using this ATM?'). In some instances, this detection also may be based on detecting the presence of the customer's mobile device (e.g., via Bluetooth, Wi-Fi, beacon, or other means). In some instances, the customer also may be able to respond to and/or interact with the ATM's offer for help using natural language (e.g., the customer can ask questions, and the ATM/system can walk the customer through how to authenticate, how to complete withdrawals/ deposits, how to use other functions).

Figure 1A:
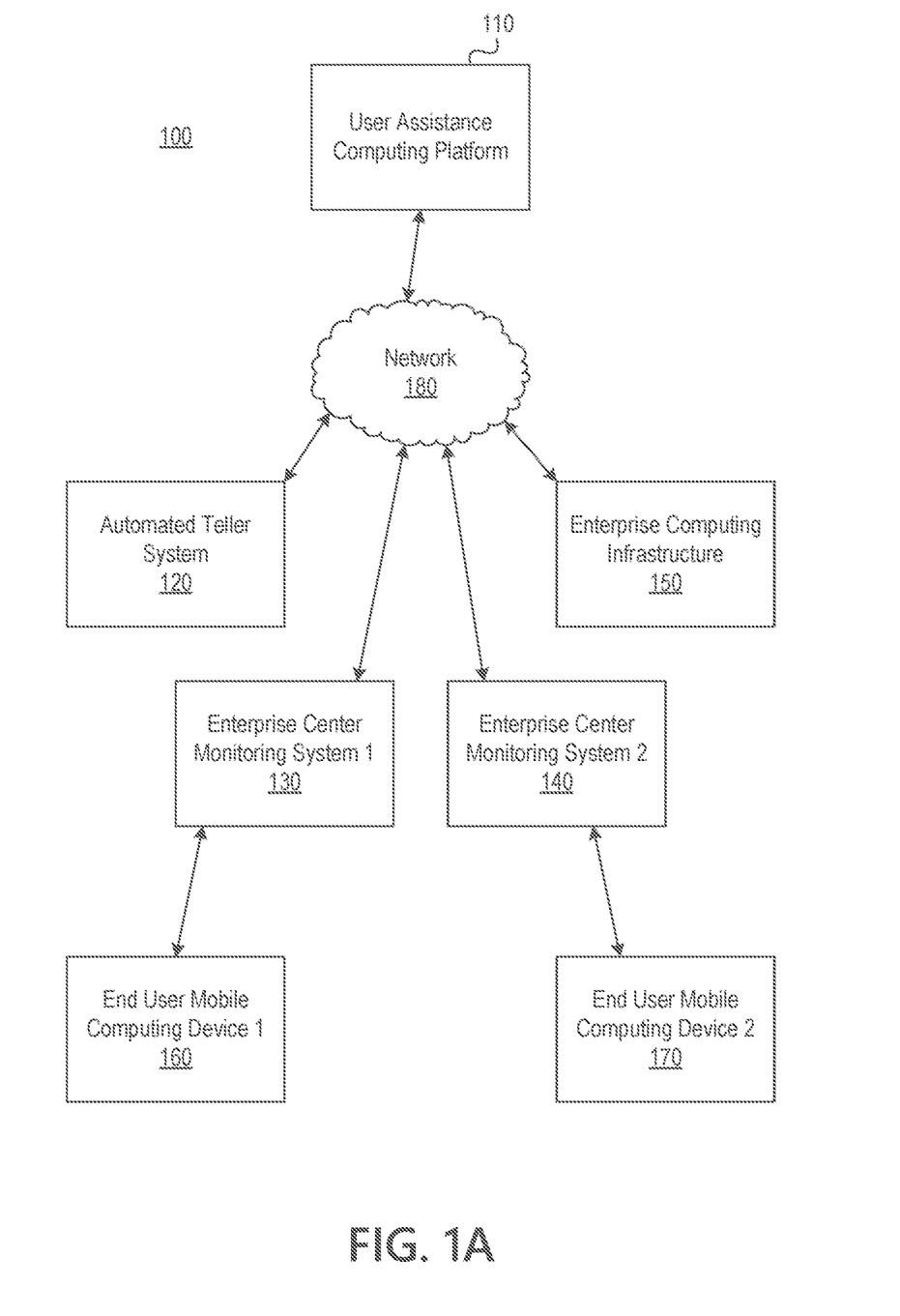
FIGS. 1A and 1B depict an illustrative computing environment for detecting usage issues on enterprise systems and dynamically providing user assistance in accordance with one or more example embodiments.
Figure 1B:
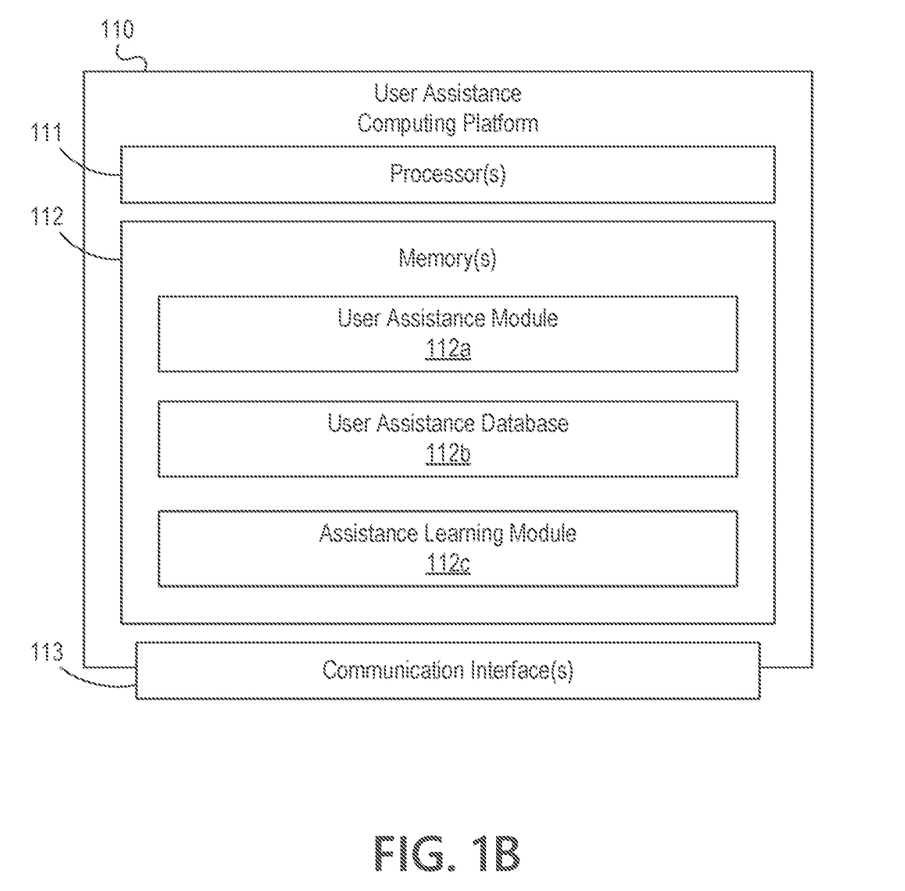

FIGS. 1A and 1B depict an illustrative computing environment for detecting usage issues on enterprise systems and dynamically providing user assistance in accordance with one or more example embodiments. Referring to FIG. 1A, computing environment 100 may include one or more computer systems. For example, computing environment 100 may include user assistance computing platform 110, automated teller system 120, enterprise center monitoring system 130, enterprise center monitoring system 140, enterprise computing infrastructure 150, end user mobile computing device 160, and end user mobile computing device 170.

As illustrated in greater detail below, user assistance computing platform 110 may include one or more computing devices configured to perform one or more of the functions described herein. For example, user assistance computing platform 110 may include one or more computers (e.g., laptop computers, desktop computers, servers, server blades, or the like).

Automated teller system 120 may include one or more computing devices and may be connected to one or more automated teller machines (ATMs), automated teller assistants (ATAs), and/or other systems and/or devices. In some instances, automated teller system 120 may be configured to support communications, monitoring, operations, and/or other functions of multiple ATMs, ATAs, and/or other systems and/or devices, which may be deployed at multiple different locations.

Enterprise center monitoring system 130 may include one or more computing devices and/or other computer components (e.g., processors, memories, communication interfaces). In addition, and as illustrated in greater detail below, enterprise center monitoring system 130 may be configured to receive information from, send information to, and/or otherwise exchange information with one or more devices that are physically present at and/or within a certain range of a first enterprise location (e.g., a banking center, a financial services center, an automated teller machine vestibule, or another enterprise location) at which enterprise center monitoring system 130 may be deployed.

Enterprise center monitoring system 140 may include one or more computing devices and/or other computer components (e.g., processors, memories, communication interfaces). In addition, and as illustrated in greater detail below, enterprise center monitoring system 140 may be configured to receive information from, send information to, and/or otherwise exchange information with one or more devices that are physically present at and/or within a certain range of a second enterprise location (e.g., a banking center, a financial services center, an automated teller machine vestibule, or another enterprise location) at which enterprise center monitoring system 140 may be deployed. The second enterprise location (e.g., where enterprise center monitoring system 140 is deployed) may be remote from and/or different from the first enterprise location (e.g., where enterprise center monitoring system 130 is deployed).

Enterprise computing infrastructure 150 may include one or more computing devices and/or other computer components (e.g., processors, memories, communication interfaces). In addition, and as illustrated in greater detail below, enterprise computing infrastructure 150 may be configured to provide various enterprise and/or back-office computing functions for an organization, such as a financial institution. For example, enterprise computing infrastructure 150 may include various servers and/or databases that store and/or otherwise maintain account information, such as financial account information including account balances, transaction history, account owner information, and/or other information. In addition, enterprise computing infrastructure 150 may process and/or otherwise execute transactions on specific accounts based on commands and/or other information received from other computer systems included in computing environment 100. Additionally or alternatively, enterprise computing infrastructure 150 may include various servers and/or databases that host and/or otherwise provide an online banking portal and/or one or more other websites, various servers and/or databases that host and/or otherwise provide a mobile banking portal and/or one or more other mobile applications, one or more interactive voice response (IVR) systems, and/or other systems.

End user mobile computing device 160 may be a mobile computing device (e.g., smartphone, tablet, smart watch, laptop computer, or the like). In addition, end user mobile computing device 160 may be linked to and/or used by a first user (who may, e.g., be a customer or other individual visiting an enterprise location, such as the first enterprise location where enterprise center monitoring system 130 may be deployed or the second enterprise location where enterprise center monitoring system 140 may be deployed). End user mobile computing device 170 also may be a mobile computing device (e.g., smartphone, tablet, smart watch, laptop computer, or the like). In addition, end user mobile computing device 170 may be linked to and/or used by a second user (who may, e.g., be a customer or other individual visiting an enterprise location, such as the first enterprise location where enterprise center monitoring system 130 may be deployed or the second enterprise location where enterprise center monitoring system 140 may be deployed) different from the first user.

Computing environment 100 also may include one or more networks, which may interconnect one or more of user assistance computing platform 110, automated teller system 120, enterprise center monitoring system 130, enterprise center monitoring system 140, enterprise computing infrastructure 150, end user mobile computing device 160, and end user mobile computing device 170. For example, computing environment 100 may include a network 180 (which may, e.g., interconnect user assistance computing platform 110, automated teller system 120, enterprise center monitoring system 130, enterprise center monitoring system 140, enterprise computing infrastructure 150, and/or one or more other systems which may be associated with an enterprise organization, such as a financial institution, with one or more other systems, public networks, sub-networks, and/or the like).

In one or more arrangements, user assistance computing platform 110, automated teller system 120, enterprise center monitoring system 130, enterprise center monitoring system 140, enterprise computing infrastructure 150, end user mobile computing device 160, and end user mobile computing device 170 may be any type of computing device capable of receiving a user interface, receiving input via the user interface, and communicating the received input to one or more other computing devices. For example, user assistance computing platform 110, automated teller system 120, enterprise center monitoring system 130, enterprise center monitoring system 140, enterprise computing infrastructure 150, end user mobile computing device 160, end user mobile computing device 170, and/or the other systems included in computing environment 100 may, in some instances, include one or more processors, memories, communication interfaces, storage devices, and/or other components. As noted above, and as illustrated in greater detail below, any and/or all of user assistance computing platform 110, automated teller system 120, enterprise center monitoring system 130, enterprise center monitoring system 140, enterprise computing infrastructure 150, end user mobile computing device 160, and end user mobile computing device 170 may, in some instances, be special-purpose computing devices configured to perform specific functions.

Referring to FIG. 1B, user assistance computing platform 110 may include one or more processor(s) 111, memory(s) 112, and communication interface(s) 113. A data bus may interconnect processor 111, memory 112, and communication interface 113. Communication interface 113 may be a network interface configured to support communication between user assistance computing platform 110 and one or more networks (e.g., network 180 or the like). Memory 112 may include one or more program modules having instructions that when executed by processor 111 cause user assistance computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of user assistance computing platform 110 and/or by different computing devices that may form and/or otherwise make up user assistance computing platform 110. For example, memory 112 may have, store, and/or include a user assistance module 112a, a user assistance database 112b, and an assistance learning module 112c. User assistance module 112a may have instructions that direct and/or cause user assistance computing platform 110 to detect usage issues on enterprise systems and dynamically provide user assistance, as discussed in greater detail below. User assistance database 112b may store information used by user assistance module 112a and/or user assistance computing platform 110 in detecting usage issues on enterprise systems and dynamically providing user assistance. Assistance learning module 112c may have instructions that direct and/or cause user assistance computing platform 110 to generate, store, update, and/or use one or more machine learning models in detecting usage issues on enterprise systems and dynamically providing user assistance.

Figure 2A:
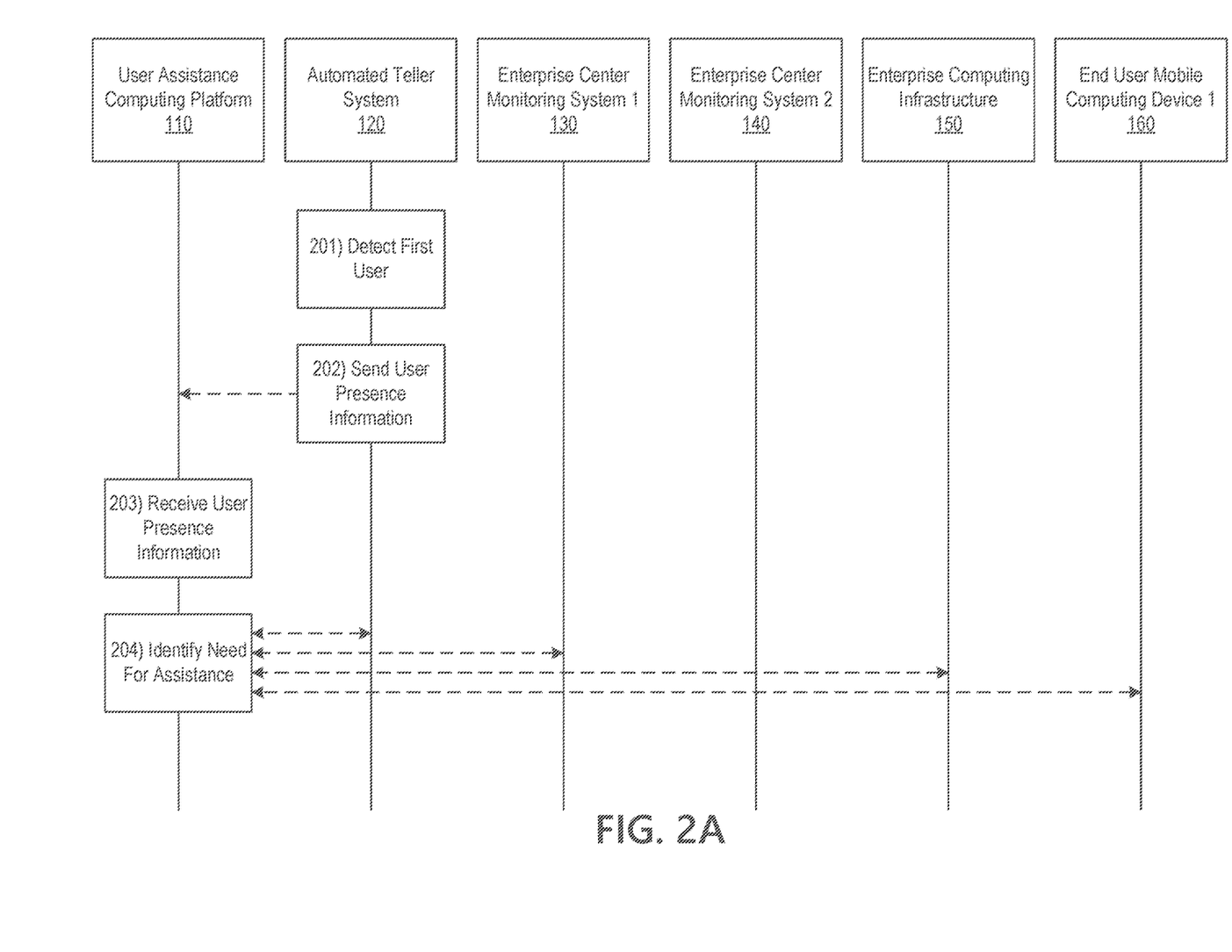
FIGS. 2A and 2B depict an illustrative event sequence for detecting usage issues on enterprise systems and dynamically providing user assistance in accordance with one or more example embodiments.
Figure 2B:
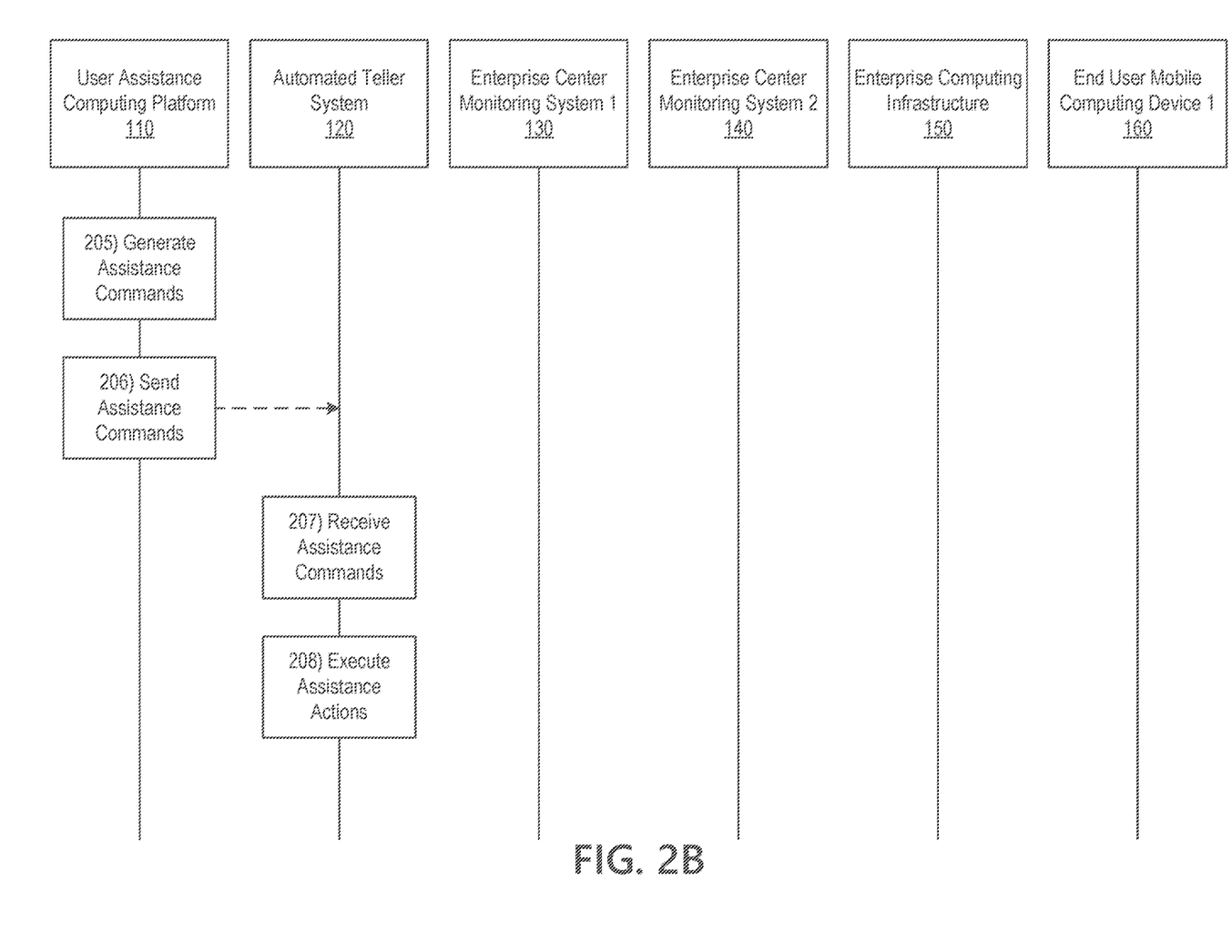

FIGS. 2A and 2B depict an illustrative event sequence for detecting usage issues on enterprise systems and dynamically providing user assistance in accordance with one or more example embodiments. Referring to FIG. 2A, at step 201, automated teller system 120 may detect that a first user is present at a first automated teller machine. For instance, automated teller system 120 may detect that the first user is present at the first automated teller machine based on data captured by one or more cameras connected to automated teller system 120 (e.g., biometric cameras, security cameras, and/or other cameras), device detection data (e.g., wireless signals captured and/or received by automated teller system 120 from one or more devices linked to the first user), and/or based on other information captured by automated teller system 120.

At step 202, automated teller system 120 may send user presence information to user assistance computing platform 110. For example, at step 202, automated teller system 120 may send any and/or all of the information that was captured by the first automated teller machine and/or automated teller system 120 at step 201 and/or other information indicating the presence of the first user at the first automated teller machine.

At step 203, user assistance computing platform 110 may receive the user presence information from automated teller system 120. For example, at step 203, user assistance computing platform 110 may receive, via the communication interface (e.g., communication interface 113), from an automated teller system (e.g., automated teller system 120), user presence information indicating that a first user has been detected at a first automated teller machine associated with the automated teller system (e.g., automated teller system 120).

In some embodiments, receiving the user presence information from the automated teller system may include receiving face recognition data captured by a facial recognition camera connected to the first automated teller machine associated with the automated teller system. For example, in receiving the user presence information from the automated teller system (e.g., automated teller system 120), user assistance computing platform 110 may receive face recognition data captured by a facial recognition camera connected to the first automated teller machine associated with the automated teller system (e.g., automated teller system 120). In addition, user assistance computing platform 110 may identify and/or authenticate the first user based on this face recognition data.

In some embodiments, receiving the user presence information from the automated teller system may include receiving license plate data from a drive-up camera connected to the first automated teller machine associated with the automated teller system. For example, in receiving the user presence information from the automated teller system (e.g., automated teller system 120), user assistance computing platform 110 may receive license plate data from a drive-up camera connected to the first automated teller machine associated with the automated teller system (e.g., automated teller system 120). In addition, user assistance computing platform 110 may identify and/or authenticate the first user based on this license plate data.

In some embodiments, receiving the user presence information from the automated teller system may include receiving device detection data from an enterprise center monitoring system deployed at a location associated with the automated teller system. For example, in receiving the user presence information from the automated teller system (e.g., automated teller system 120), user assistance computing platform 110 may receive device detection data from an enterprise center monitoring system (e.g., enterprise center monitoring system 130) deployed at a location associated with the automated teller system (e.g., automated teller system 120). In addition, user assistance computing platform 110 may identify and/or authenticate the first user based on this device detection data.

At step 204, user assistance computing platform 110 may identify that the user has a need for assistance (e.g., based on information received from, sent to, and/or otherwise exchanged with automated teller system 120, enterprise center monitoring system 130, enterprise computing infrastructure 150, and/or end user mobile computing device 160). For example, at step 204, user assistance computing platform 110 may identify, based on the user presence information received from the automated teller system (e.g., automated teller system 120), that the first user has a need for assistance with the first automated teller machine associated with the automated teller system (e.g., automated teller system 120).

In some embodiments, identifying that the first user has the need for assistance with the first automated teller machine associated with the automated teller system may include determining that the first user is a new user of the first automated teller machine. For example, in identifying that the first user has the need for assistance with the first automated teller machine associated with the automated teller system (e.g., automated teller system 120), user assistance computing platform 110 may determine that the first user is a new user of the first automated teller machine (e.g., based on customer records maintained by user assistance computing platform 110 and/or enterprise computing infrastructure 150).

In some embodiments, identifying that the first user has the need for assistance with the first automated teller machine associated with the automated teller system may include determining that the first user is idle at the first automated teller machine. For example, in identifying that the first user has the need for assistance with the first automated teller machine associated with the automated teller system (e.g., automated teller system 120), user assistance computing platform 110 may determine that the first user is idle at the first automated teller machine. For instance, user assistance computing platform 110 may detect that the user is sitting at the ATM for more than a threshold amount of time and potentially stuck on where to get started. This threshold may, for instance, be customer-specific and may be determined by user assistance computing platform 110 based on each individual customer's prior interactions and/or experiences with customer-facing technology deployed by the financial institution. For instance, user assistance computing platform 110 may implement different rules for different customers.

In some embodiments, identifying that the first user has the need for assistance with the first automated teller machine associated with the automated teller system may include determining that the first user is looking at one or more menu items based on eye detection data captured by a camera connected to the first automated teller machine associated with the automated teller system. For example, in identifying that the first user has the need for assistance with the first automated teller machine associated with the automated teller system (e.g., automated teller system 120), user assistance computing platform 110 may determine that the first user is looking at one or more menu items based on eye detection data captured by a camera connected to the first automated teller machine associated with the automated teller system (e.g., automated teller system 120). Such a camera may, for instance, capture, generate, and/or provide data indicating what the user and/or their pupils are looking at, and user assistance computing platform 110 may identify that the user needs assistance with one or more specific functions based on this data (e.g., the user may require assistance with a menu item that he or she is looking at).

In some embodiments, identifying that the first user has the need for assistance with the first automated teller machine associated with the automated teller system may include determining that the first user is holding one or more physical items based on object detection data captured by a camera connected to the first automated teller machine associated with the automated teller system. For example, in identifying that the first user has the need for assistance with the first automated teller machine associated with the automated teller system (e.g., automated teller system 120), user assistance computing platform 110 may determine that the first user is holding one or more physical items based on object detection data captured by a camera connected to the first automated teller machine associated with the automated teller system (e.g., automated teller system 120). For instance, such a camera may look at and/or detect what the user is doing with their hands and/or what the user is holding. As an example, if the camera captures image and/or video data showing that the user is holding a check, user assistance computing platform 110 may determine that the user may wish to deposit the check at the ATM.

In some embodiments, identifying that the first user has the need for assistance with the first automated teller machine associated with the automated teller system may include determining that the first user is having a specific issue based on audio data captured by a microphone connected to the first automated teller machine associated with the automated teller system. For example, in identifying that the first user has the need for assistance with the first automated teller machine associated with the automated teller system (e.g., automated teller system 120), user assistance computing platform 110 may determine that the first user is having a specific issue based on audio data captured by a microphone connected to the first automated teller machine associated with the automated teller system (e.g., automated teller system 120). For instance, the ATM and/or automated teller system 120 may record and/or capture audio data of the user speaking, and user assistance computing platform 110 may determine that the user needs assistance with a specific function based on this audio data. As an example, if the user blurts out "I don't know where my ATM card is," the ATM and/or automated teller system 120 may record and/or capture audio data of this speech, provide the audio data to user assistance computing platform 110, and user assistance computing platform 110 may direct the ATM and/or automated teller system 120 to respond with playback audio saying "That's OK— there are other ways I can authenticate you, such as with your mobile device." In this way, user assistance computing platform 110 may enable the ATM and/or automated teller system 120 to be listening to the user and capable of automatically rendering aid.

In some embodiments, identifying that the first user has the need for assistance with the first automated teller machine associated with the automated teller system may include determining that the first user is linked to a foreign institution based on user credentials data received from the first automated teller machine associated with the automated teller system. For example, in identifying that the first user has the need for assistance with the first automated teller machine associated with the automated teller system (e.g., automated teller system 120), user assistance computing platform 110 may determine that the first user is linked to a foreign institution based on user credentials data received from the first automated teller machine associated with the automated teller system (e.g., automated teller system 120). For instance, user assistance computing platform 110 may determine that the user is not a customer of the financial institution operating the ATM and/or automated teller system 120 but instead is the customer of another, third-party financial institution. Such a determination may, for instance, affect what kind of assistance user assistance computing platform 110 provides to the user. For instance, different financial institutions may have different layouts of ATM user interfaces, and user assistance computing platform 110 may switch the ATM's user interface layout into a different layout that matches the layout used by their financial institution (and which, e.g., the user thus may be more comfortable using). Additionally or alternatively, user assistance computing platform 110 may direct the ATM and/or automated teller system 120 to provide the user with offers to become a customer of the financial institution operating the ATM and/or automated teller system 120.

Referring to FIG. 2B, at step 205, user assistance computing platform 110 may generate one or more assistance commands. For example, at step 205, in response to identifying that the first user has the need for assistance, user assistance computing platform 110 may generate one or more commands directing the first automated teller machine associated with the automated teller system (e.g., automated teller system 120) to execute one or more automated assistance actions corresponding to the need for assistance.

In some embodiments, generating the one or more commands directing the first automated teller machine associated with the automated teller system to execute the one or more automated assistance actions corresponding to the need for assistance may include generating at least one command that causes the first automated teller machine to display one or more dynamically colored navigation options. For example, in generating the one or more commands directing the first automated teller machine associated with the automated teller system (e.g., automated teller system 120) to execute the one or more automated assistance actions corresponding to the need for assistance, user assistance computing platform 110 may generate at least one command that causes the first automated teller machine to display one or more dynamically colored navigation options. Such options may, for instance, be dynamically colored buttons that are generated by user assistance computing platform 110 and/or displayed by the ATM based on the user's online banking preferences and/or other web or mobile settings.

In some embodiments, generating the one or more commands directing the first automated teller machine associated with the automated teller system to execute the one or more automated assistance actions corresponding to the need for assistance may include generating at least one command that causes the first automated teller machine to display a tutorial video based on a sequence of the first user's interactions with the first automated teller machine. For example, in generating the one or more commands directing the first automated teller machine associated with the automated teller system (e.g., automated teller system 120) to execute the one or more automated assistance actions corresponding to the need for assistance, user assistance computing platform 110 may generate at least one command that causes the first automated teller machine to display a tutorial video based on a sequence of the first user's interactions with the first automated teller machine. For instance, user assistance computing platform 110 may trigger playback of such a video based on the actions that the user has performed on the ATM so far in their interaction with the ATM.

In some embodiments, generating the one or more commands directing the first automated teller machine associated with the automated teller system to execute the one or more automated assistance actions corresponding to the need for assistance may include generating at least one command that causes the first automated teller machine to initiate a video assistance call with the first user on a display screen connected to the first automated teller machine. For example, in generating the one or more commands directing the first automated teller machine associated with the automated teller system (e.g., automated teller system 120) to execute the one or more automated assistance actions corresponding to the need for assistance, user assistance computing platform 110 may generate at least one command that causes the first automated teller machine to initiate a video assistance call with the first user on a display screen connected to the first automated teller machine. For instance, user assistance computing platform 110 may connect the user to a video call on a nearby display screen, so as to provide the user with assistance.

In some embodiments, generating the one or more commands directing the first automated teller machine associated with the automated teller system to execute the one or more automated assistance actions corresponding to the need for assistance may include generating at least one command that causes the first automated teller machine to initiate a video assistance call with the first user on a mobile computing device linked to the first user. For example, in generating the one or more commands directing the first automated teller machine associated with the automated teller system (e.g., automated teller system 120) to execute the one or more automated assistance actions corresponding to the need for assistance, user assistance computing platform 110 may generate at least one command that causes the first automated teller machine to initiate a video assistance call with the first user on a mobile computing device linked to the first user. For instance, user assistance computing platform 110 may connect the user to a video call on their mobile device (e.g., end user mobile computing device 160) and/or may initiate such a video call in a mobile banking application executing on their mobile device (e.g., end user mobile computing device 160), so as to provide the user with assistance.

In some embodiments, generating the one or more commands directing the first automated teller machine associated with the automated teller system to execute the one or more automated assistance actions corresponding to the need for assistance may include generating at least one command that causes the first automated teller machine to display assistance information identifying one or more steps to perform one or more functions on the first automated teller machine. For example, in generating the one or more commands directing the first automated teller machine associated with the automated teller system (e.g., automated teller system 120) to execute the one or more automated assistance actions corresponding to the need for assistance, user assistance computing platform 110 may generate at least one command that causes the first automated teller machine to display assistance information identifying one or more steps to perform one or more functions on the first automated teller machine. For instance, user assistance computing platform 110 may cause the ATM to display tips on easier and/or faster ways to perform one or more functions (which the user may, e.g., be attempting to perform on the ATM).

In some embodiments, generating the one or more commands directing the first automated teller machine associated with the automated teller system to execute the one or more automated assistance actions corresponding to the need for assistance may include generating at least one command that causes the first automated teller machine to display update information identifying one or more recently updated functions of the first automated teller machine. For example, in generating the one or more commands directing the first automated teller machine associated with the automated teller system (e.g., automated teller system 120) to execute the one or more automated assistance actions corresponding to the need for assistance, user assistance computing platform 110 may generate at least one command that causes the first automated teller machine to display update information identifying one or more recently updated functions of the first automated teller machine. For instance, user assistance computing platform 110 may cause the ATM to display tips on functions that have been updated and/or newly added to the ATM since the last time the customer visited an ATM.

In some embodiments, generating the one or more commands directing the first automated teller machine associated with the automated teller system to execute the one or more automated assistance actions corresponding to the need for assistance may include generating at least one command that causes the first automated teller machine to display replacement information identifying one or more replacement functions available at the first automated teller machine. For example, in generating the one or more commands directing the first automated teller machine associated with the automated teller system (e.g., automated teller system 120) to execute the one or more automated assistance actions corresponding to the need for assistance, user assistance computing platform 110 may generate at least one command that causes the first automated teller machine to display replacement information identifying one or more replacement functions available at the first automated teller machine. For instance, user assistance computing platform 110 may cause the ATM to display tips on functions that the user typically performs in a banking center but can be performed at the ATM instead. User assistance computing platform 110 may generate such tips and/or associated interface information based on customer history information identifying the functions that the user usually performs inside in the banking center. Additionally or alternatively, user assistance computing platform 110 may enable the user to pre-stage transactions at the ATM that may then be completed in the banking center, so as to reduce the user's time indoors in the banking center.

At step 206, user assistance computing platform 110 may send the one or more assistance commands to automated teller system 120. For example, at step 206, user assistance computing platform 110 may send, via the communication interface (e.g., communication interface 113), to the automated teller system (e.g., automated teller system 120), the one or more commands directing the first automated teller machine associated with the automated teller system (e.g., automated teller system 120) to execute the one or more automated assistance actions corresponding to the need for assistance. In addition, by sending the one or more commands directing the first automated teller machine associated with the automated teller system (e.g., automated teller system 120) to execute the one or more automated assistance actions corresponding to the need for assistance, user assistance computing platform 110 may cause the first automated teller machine associated with the automated teller system (e.g., automated teller system 120) to execute the one or more automated assistance actions corresponding to the need for assistance. For instance, user assistance computing platform 110 may cause the ATM and/or automated teller system 120 to execute one or more of the actions described above based on the one or more commands that were generated by user assistance computing platform 110 at step 205.

At step 207, automated teller system 120 may receive the one or more assistance commands from user assistance computing platform 110. At step 208, automated teller system 120 may execute one or more assistance actions. For example, at step 208, automated teller system 120 may command and/or control the first automated teller machine to cause the first automated teller machine to execute one or more assistance actions based on the one or more assistance commands received from user assistance computing platform 110. Additionally or alternatively, automated teller system 120 may execute one or more assistance actions itself based on the one or more assistance commands received from user assistance computing platform 110.

Figure 3:
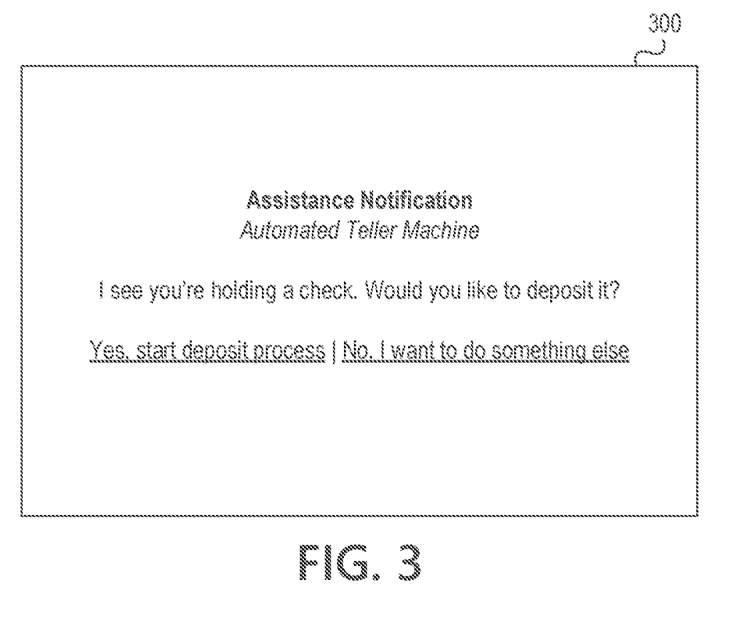
FIGS. 3 and 4 depict example graphical user interfaces for detecting usage issues on enterprise systems and dynamically providing user assistance in accordance with one or more example embodiments.
Figure 4:
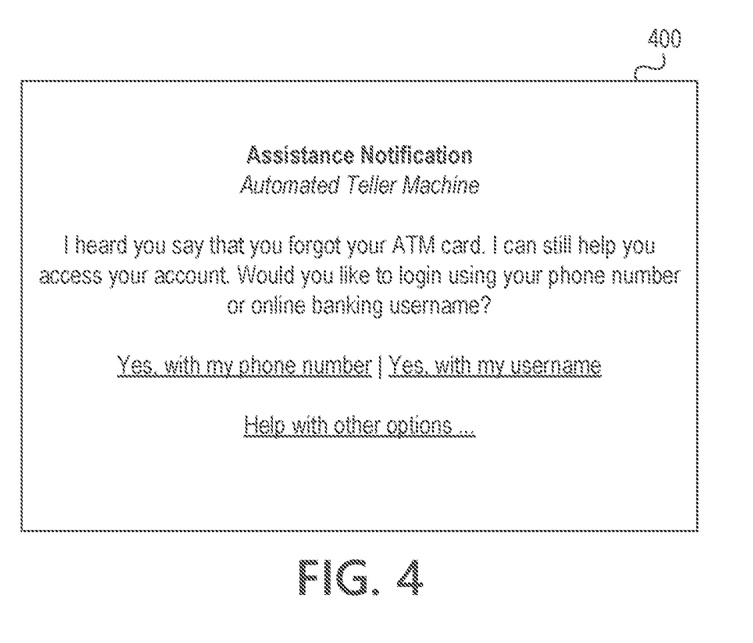

In some instances, in executing the one or more assistance actions, automated teller system 120 may cause the first automated teller machine to display and/or otherwise present a graphical user interface similar to graphical user interface 300, which is illustrated in FIG. 3. As seen in FIG. 3, graphical user interface 300 may include text and/or other information indicating that a user intent has been detected based on captured image data and that the ATM is able to provide relevant assistance actions (e.g., "I see you're holding a check. Would you like to deposit it? Yes, start deposit process|No, I want to do something else"). As another example, in executing the one or more assistance actions, automated teller system 120 may cause the first automated teller machine to display and/or otherwise present a graphical user interface similar to graphical user interface 400, which is illustrated in FIG. 4. As seen in FIG. 4, graphical user interface 400 may include text and/or other information indicating that a user intent has been detected based on captured audio data and that the ATM is able to provide relevant assistance actions (e.g., "I heard you say that you forgot your ATM card. I can still help you access your account. Would you like to login using your phone number or online banking username? Yes, with my phone number|Yes, with my username|Help with other options . . . ").

Figure 5:
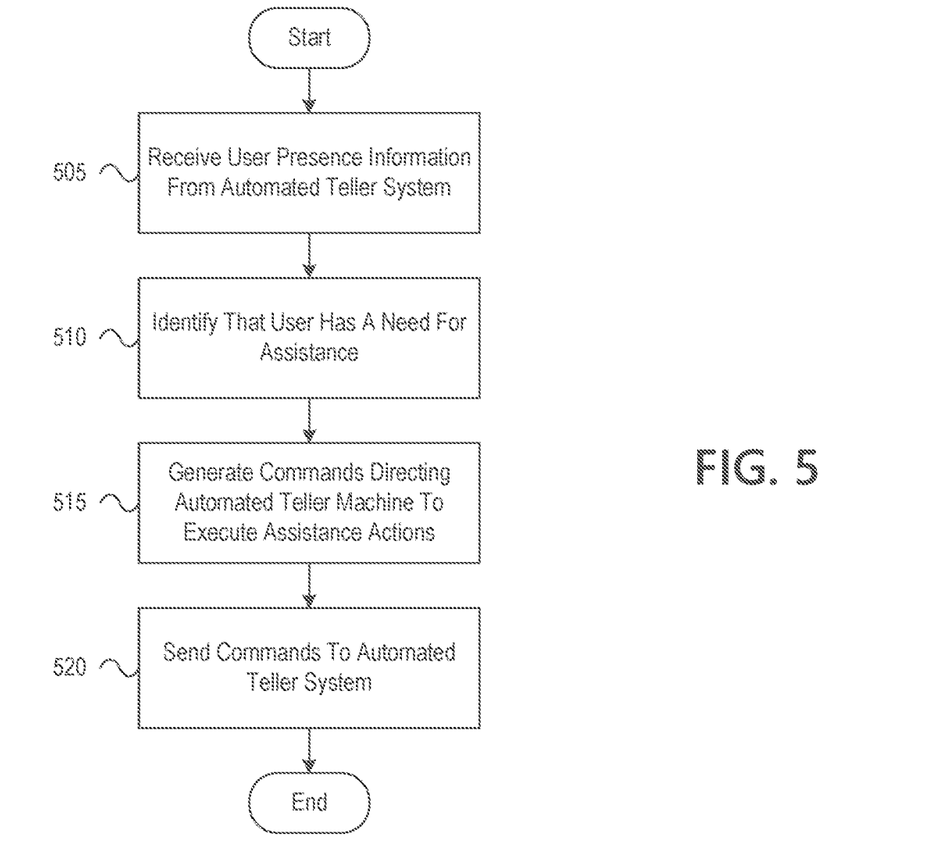
FIG. 5 depicts an illustrative method for detecting usage issues on enterprise systems and dynamically providing user assistance in accordance with one or more example embodiments.

FIG. 5 depicts an illustrative method for detecting usage issues on enterprise systems and dynamically providing user assistance in accordance with one or more example embodiments. Referring to FIG. 5, at step 505, a computing platform having at least one processor, a communication interface, and memory may receive, via the communication interface, from an automated teller system, user presence information indicating that a first user has been detected at a first automated teller machine associated with the automated teller system. At step 510, the computing platform may identify, based on the user presence information received from the automated teller system, that the first user has a need for assistance with the first automated teller machine associated with the automated teller system. At step 515, in response to identifying that the first user has the need for assistance, the computing platform may generate one or more commands directing the first automated teller machine associated with the automated teller system to execute one or more automated assistance actions corresponding to the need for assistance. At step 520, the computing platform may send, via the communication interface, to the automated teller system, the one or more commands directing the first automated teller machine associated with the automated teller system to execute the one or more automated assistance actions corresponding to the need for assistance. In addition, sending the one or more commands directing the first automated teller machine associated with the automated teller system to execute the one or more automated assistance actions corresponding to the need for assistance may cause the first automated teller machine associated with the automated teller system to execute the one or more automated assistance actions corresponding to the need for assistance.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, from an automated teller system, user presence information indicating that a first user has been detected at a first automated teller machine associated with the automated teller system;
      identify, based on the user presence information received from the automated teller system, that the first user has a usage issue that includes a need for assistance with the first automated teller machine associated with the automated teller system, wherein identifying that the first user has the usage issue that includes the need for assistance with the first automated teller machine associated with the automated teller system comprises:
         determining that the first user is holding one or more physical items based on object detection data captured by a camera connected to the first automated teller machine associated with the automated teller system, and
         determining that the first user is linked to a foreign institution based on user credentials data received from the first automated teller machine associated with the automated teller system, wherein the foreign institution is associated with another automated teller system having a layout different from the first automated teller machine;
      in response to identifying that the first user has the need for assistance, generate one or more commands directing the first automated teller machine associated with the automated teller system to execute one or more automated assistance actions corresponding to the need for assistance; and
      send, via the communication interface, to the automated teller system, the one or more commands directing the first automated teller machine associated with the automated teller system to execute the one or more automated assistance actions corresponding to the need for assistance, wherein sending the one or more commands directing the first automated teller machine associated with the automated teller system to execute the one or more automated assistance actions corresponding to the need for assistance causes the first automated teller machine associated with the automated teller system to execute the one or more automated assistance actions corresponding to the need for assistance.

2. The computing platform of claim 1, wherein receiving the user presence information from the automated teller system comprises receiving face recognition data captured by a facial recognition camera connected to the first automated teller machine associated with the automated teller system.

3. The computing platform of claim 1, wherein receiving the user presence information from the automated teller system comprises receiving license plate data from a drive-up camera connected to the first automated teller machine associated with the automated teller system.

4. The computing platform of claim 1, wherein receiving the user presence information from the automated teller system comprises receiving device detection data from an enterprise center monitoring system deployed at a location associated with the automated teller system.

5. The computing platform of claim 1, wherein identifying that the first user has the need for assistance with the first automated teller machine associated with the automated teller system further comprises determining that the first user is a new user of the first automated teller machine.

6. The computing platform of claim 1, wherein identifying that the first user has the need for assistance with the first automated teller machine associated with the automated teller system further comprises determining that the first user is looking at one or more menu items based on eye detection data captured by a camera indicating what the first user is looking at and connected to the first automated teller machine associated with the automated teller system.

7. The computing platform of claim 1, wherein identifying that the first user has the need for assistance with the first automated teller machine associated with the automated teller system further comprises determining that the first user is having a specific issue based on audio data captured by a microphone connected to the first automated teller machine associated with the automated teller system.

8. The computing platform of claim 1, wherein generating the one or more commands directing the first automated teller machine associated with the automated teller system to execute the one or more automated assistance actions corresponding to the need for assistance comprises generating at least one command that causes the first automated teller machine to display one or more dynamically colored navigation options.

9. The computing platform of claim 1, wherein generating the one or more commands directing the first automated teller machine associated with the automated teller system to execute the one or more automated assistance actions corresponding to the need for assistance comprises generating at least one command that causes the first automated teller machine to display a tutorial video based on a sequence of the first user's interactions with the first automated teller machine.

10. The computing platform of claim 1, wherein generating the one or more commands directing the first automated teller machine associated with the automated teller system to execute the one or more automated assistance actions corresponding to the need for assistance comprises generating at least one command that causes the first automated teller machine to initiate a video assistance call with the first user on a display screen connected to the first automated teller machine.

11. The computing platform of claim 1, wherein generating the one or more commands directing the first automated teller machine associated with the automated teller system to execute the one or more automated assistance actions corresponding to the need for assistance comprises generating at least one command that causes the first automated teller machine to initiate a video assistance call with the first user on a mobile computing device linked to the first user.

12. The computing platform of claim 1, wherein generating the one or more commands directing the first automated teller machine associated with the automated teller system to execute the one or more automated assistance actions corresponding to the need for assistance comprises generating at least one command that causes the first automated teller machine to display assistance information identifying one or more steps to perform one or more functions on the first automated teller machine.

13. The computing platform of claim 1, wherein generating the one or more commands directing the first automated teller machine associated with the automated teller system to execute the one or more automated assistance actions corresponding to the need for assistance comprises generating at least one command that causes the first automated teller machine to display update information identifying one or more recently updated functions of the first automated teller machine.

14. The computing platform of claim 1, wherein generating the one or more commands directing the first automated teller machine associated with the automated teller system to execute the one or more automated assistance actions corresponding to the need for assistance comprises generating at least one command that causes the first automated teller machine to display replacement information identifying one or more replacement functions available at the first automated teller machine.

15. A method, comprising:
at a computing platform comprising at least one processor, a communication interface, and memory:
receiving, by the at least one processor, via the communication interface, from an automated teller system, user presence information indicating that a first user has been detected at a first automated teller machine associated with the automated teller system;
identifying, by the at least one processor, based on the user presence information received from the automated teller system, that the first user has a usage issue that includes a need for assistance with the first automated teller machine associated with the automated teller system, wherein identifying that the first user has the usage issue that includes the need for assistance with the first automated teller machine associated with the automated teller system comprises:
determining that the first user is holding one or more physical items based on object detection data captured by a camera connected to the first automated teller machine associated with the automated teller system, and
determining that the first user is linked to a foreign institution based on user credentials data received from the first automated teller machine associated with the automated teller system, wherein the foreign institution is associated with another automated teller system having a layout different from the first automated teller machine;
in response to identifying that the first user has the need for assistance, generating, by the at least one processor, one or more commands directing the first automated teller machine associated with the automated teller system to execute one or more automated assistance actions corresponding to the need for assistance; and
sending, by the at least one processor, via the communication interface, to the automated teller system, the one or more commands directing the first automated teller machine associated with the automated teller system to execute the one or more automated assistance actions corresponding to the need for assistance, wherein sending the one or more commands directing the first automated teller machine associated with the automated teller system to execute the one or more automated assistance actions corresponding to the need for assistance causes the first automated teller machine associated with the automated teller system to execute the one or more automated assistance actions corresponding to the need for assistance.

16. The method of claim 15, wherein receiving the user presence information from the automated teller system comprises receiving face recognition data captured by a facial recognition camera connected to the first automated teller machine associated with the automated teller system.

17. The method of claim 15, wherein receiving the user presence information from the automated teller system comprises receiving device detection data from an enterprise center monitoring system deployed at a location associated with the automated teller system.

18. The method of claim 15, wherein identifying that the first user has the need for assistance with the first automated teller machine associated with the automated teller system further comprises determining that the first user is a new user of the first automated teller machine.

19. One or more non-transitory computer-readable media storing instructions that, when executed by a computing platform comprising at least one processor, a communication interface, and memory, cause the computing platform to:

receive, via the communication interface, from an automated teller system, user presence information indicating that a first user has been detected at a first automated teller machine associated with the automated teller system;

identify, based on the user presence information received from the automated teller system, that the first user has a usage issue that includes a need for assistance with the first automated teller machine associated with the automated teller system, wherein identifying that the first user has the usage issue that includes the need for assistance with the first automated teller machine associated with the automated teller system comprises:

determining that the first user is holding one or more physical items based on object detection data captured by a camera connected to the first automated teller machine associated with the automated teller system, determining that the first user is linked to a foreign institution based on user credentials data received from the first automated teller machine associated with the automated teller system, wherein the foreign institution is associated with another automated teller system having a layout different from the first automated teller machine;

in response to identifying that the first user has the need for assistance, generate one or more commands directing the first automated teller machine associated with the automated teller system to execute one or more automated assistance actions corresponding to the need for assistance; and send, via the communication interface, to the automated teller system, the one or more commands directing the first automated teller machine associated with the automated teller system to execute the one or more automated assistance actions corresponding to the need for assistance, wherein sending the one or more commands directing the first automated teller machine associated with the automated teller system to execute the one or more automated assistance actions corresponding to the need for assistance causes the first automated teller machine associated with the automated teller system to execute the one or more automated assistance actions corresponding to the need for assistance.

* * * * *